Oct. 3, 1939.                R. C. HUGHES                 2,174,515
           APPARATUS FOR AUTOMATICALLY CONTROLLING
              REDUCING VALVES IN GAS REGULATORS
                     Filed Sept. 1, 1936
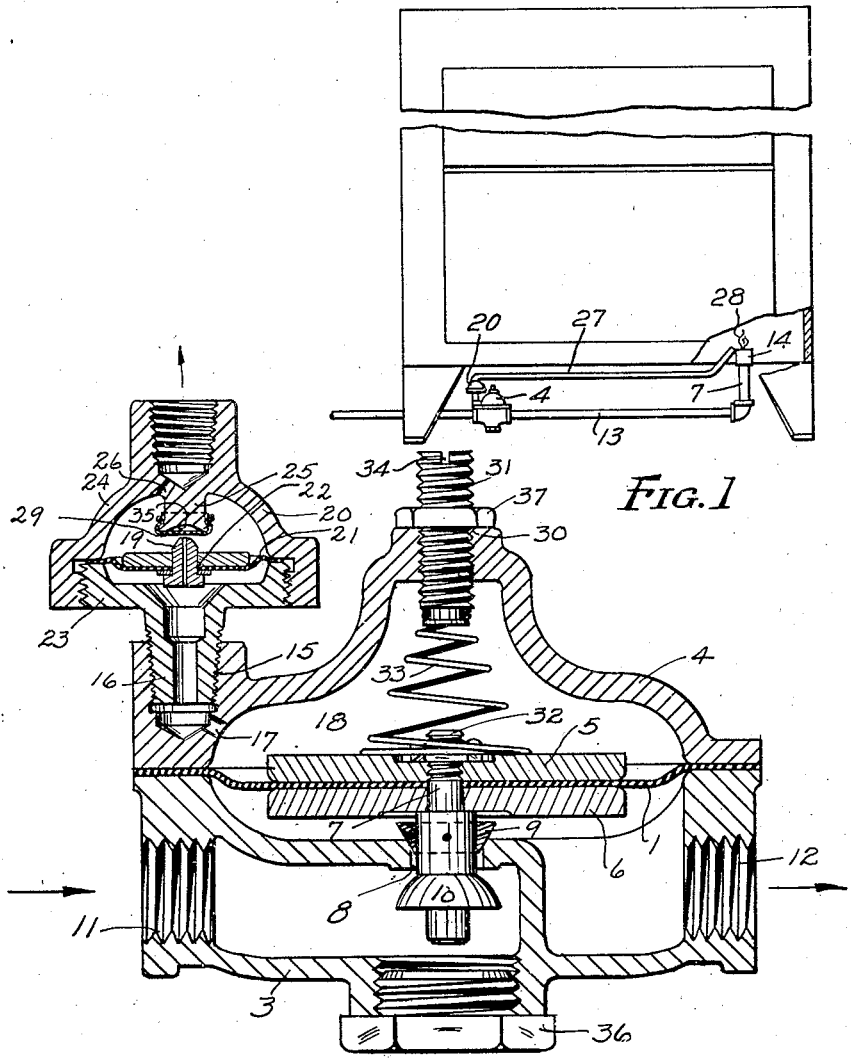
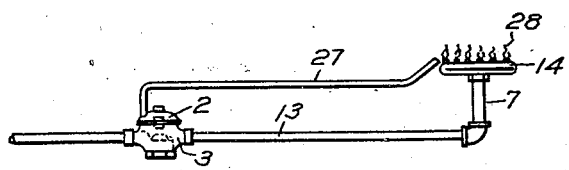
INVENTOR.
RALPH C. HUGHES
BY Frank D. Gray
ATTORNEY.

Patented Oct. 3, 1939

2,174,515

UNITED STATES PATENT OFFICE 2,174,515

APPARATUS FOR AUTOMATICALLY CONTROLLING REDUCING VALVES IN GAS REGULATORS

Ralph C. Hughes, Anderson, Ind., assignor to Reynolds Gas Regulator Co., Anderson, Ind., a corporation of Indiana Application September 1, 1936, Serial No. 98,887

4 Claims. (Cl. 158—120)

This invention relates to a new and improved method and apparatus for automatically controlling a reducing valve in a gas regulator, and especially in the low-pressure type of regulators having a diaphragm which by fluid pressure thereon controls the reducing valve, and which regulator is provided with a bleeder device in the upper wall of the diaphragm casing, the device comprising a diaphragm casing whose diaphragm is especially sensitive to variance in gas pressure thereon which may be due to seepage of gas through the main diaphragm in any material amount.

It is a pronounced purpose of my invention as still further explained, to utilize such bleeder device on regulators for refrigerator systems which have a pilot light, to direct said gas leaking or seepage from said device to the pilot light or burner flame to be there consumed. Such bleeder device herein described controls the reducing valve in my invention, and seepage in a material amount will close such valve.

Herein I disclose an improved method of protecting against gas seepage in refrigeration systems having a diaphragm, gas reducing valve and a pilot light, comprising bleeding the atmospheric exposed side of the diaphragm to a region adjacent the pilot light; and automatically shutting the main reducing valve consequent upon a leak or seepage of gas through the diaphragm of any material amount, as in case of rupture of said diaphragm.

As an efficient means of control for the valve in my regulator I provide a bleeder mechanism having a downwardly-projecting, hollow stem externally threaded to seat in a perforated socket connecting with the upper chamber of the regulator, said socket being formed at the usual vent of the regulator. This bleeder mechanism is itself of the diaphragm type, and will be described in further detail in the body of the specification.

Other advantageous features I shall now outline in detail, later expressing claims embodying structures above described, and shown in the drawing in which:

Figure 1 is a side elevation of a refrigerator with parts broken away showing details, including valve with automatic shut-off, when seepage exists and bleeding gas;

Figure 2 is a diagrammatic view of the burner and gas pipe supply line with the conventional reduction valve but without the shut-off control by seepage, and Figure 3 is a central vertical section of a low-pressure gas regulator equipped with a bleeder device comprising a diaphragm sensitive to pressure of gas that may have leaked or seeped through the main diaphragm.

Referring to the drawing, I represents the main diaphragm of a gas regulator of the low-pressure type, the same being equipped with blocks 5 and 6 perforated to receive therein and through the central opening of the diaphragm I, the valve stem 7 guided in the partition aperture 8 thus controlling the double valve 9–10 as per gas pressure on said diaphragm.

Controlled by said valve 9–10, gas enters the inlet 11 of the regulator and passes out at the outlet 12, and thence through the gas pipe 13 to the burner 14 at the refrigerator system, while at the usual vent an internally-threaded socket 15 is provided which is designed to receive therein the lower hollow foot 16 externally threaded to fit neatly and detachably in said socket, the latter communicating with the inner upper chamber 18 of the regulator by the passage 17. A control valve 20 having said hollow foot 16 for mounting in the socket 15, as above explained, comprises an apertured diaphragm 21 whose peripheral edges are secured between annular edges of upper and lower shell portions 23 and 24 screw-threaded together, an orifice plug-member 19, being provided for insertion in said diaphragm aperture 22 to permit flow from the chamber in the lower portion 23 through said orifice plug member 19.

Integral with the upper shell portion 24 an inner central down-hanging protuberance 25 is provided having a depression 35 therein over which a slight sheet of leather 29 is covered for receiving thereon the upper end of said plug member 19, thereby closing the opening through the latter when the plug is raised against such sheet. An upper passage 26 leads outward from said upper shell portion 24, which latter may lead by separate pipe 27 to the burner flame 28, as will be later explained in greater detail.

The double valve 9–10 is operated in the aperture 8 of the partition wall by gas pressure effective upon the diaphragm I, to raise the latter by incoming pressure upon the lower surface thereof, and lifting the stem 7 whereby the valve 10 will control the gas flow through aperture 8, gas above the diaphragm I being then permitted to flow through the passages 17, the foot 16, the orifice 19, passage 26, a leading of gas flow from the portion 24 being then preferably directed through the pipe 27 to the burner flame 28, and there consumed.

The lower shell 3 of the main casing is separated by the above mentioned diaphragm I from the upper shell 4 which is provided with the central opening 30 threaded for reception of the screw-threaded adjustable plug 31 between which and an upper screw-threaded end 32 of the said valve stem 7, a frusto-conical spring 33 is positioned for providing a downward pressure upon the diaphragm I, and consequent adjustment of the double valve 10–9 for vertical movement in the said partition aperture 8, responsive to incoming gas pressure, such valve movement opposing the pressure of the spring 33, as will be readily understood. It will therefore result that the said plug 31 may by rotation by suitable hand tool applied in a cross slot 34, be adjusted to apply desired pressure upon the spring 33 which actuates the valve 9-10 by the stem 7, while gas pressure upon the diaphragm 1 will be duly sensitive as required.

In operation, the outlet 12 is connected with the pipe 13 and thence with the burner 14 at a refrigerator having the intended association with the refrigerator system, while the diaphragm valve casing 20 is mounted in proper connection at the more or less conventional vent which will assume the internally-threaded socket form 15 above explained, and the screw plug 31 adjusted to attain suitable pressure upon the coil 33 and thereby proper position of the double valve in the opening 8.

Under these normal operating conditions, the diaphragm 21 is in lowered position, permitting the regulator to breathe through the passages 17, 26, the opening in the foot 16, and the passage through the orifice member 19. Now the valve 9 is off its seat and valve 10 controls delivery pressure. If under such conditions, seepage of gas occurs through diaphragm 1, this gas passes through passage 17 and thence upward through the several openings above and out through passage 26 and into the pipe 27 to the burner 28.

It will however, result that the passage through the plug member 19 will not ordinarily pass the gas as fast as it is relieved through passage 17 and the opening in the foot 16, so that pressure builds up under diaphragm 21, causing it to rise, forcing orifice 19 against seat 29, thus closing the opening in said orifice 19. In any case, the desirable consumption of any gas that may escape from the passage 26 into the pipe 27 and thence flows to a point adjacent the flame 28, precludes the great danger of escape of gas into the room from leakage by seepage through the diaphragm.

When a rupture occurs positively in diaphragm 1, the escaping gas is relieved through passage 17 and through the foot 16. In such case, a building up of pressure under diaphragm 21 will be even more positive and pronounced, and thereby closing the opening in the orifice 19. An equalization of pressure on both sides of diaphragm 1, will, by the weights 5 and 6 and the spring tension, force valve 9 against its seat, and thereby shutting off the flow of gas through the partition opening 8. It is to be understood that with the valve 2 used in the gas connections shown in Fig. 2, any seepage of gas through the diaphragm 1 will direct such gas to the flame 28, as in the system in the other two views, but total closure of the valve 9-10 by fracture of the diaphragm is not automatically accomplished in this form of improvement.

By the rapid gas flow through the diaphragm 1 due to rupture in the latter, which is possible, the rise of the orifice 19 will result and its opening will be closed by pressure against the seat 29, so that the spring 33 would press the valve 9 carried by the stem 7, against the seat over the opening 8, and close the valve. The regulator is provided with a lower and central plug 36 for ready repair, and a lock nut 37 is applied on the plug 31, as needed.

Having thus described my invention in terms which will be readily understood by others skilled in the art to which it pertains, what I believe to be new and desire to secure by Letters Patent of the United States is:

1. The combination of a gas burner, a gas supply line therefor; a pressure regulator in said line and arranged and adapted to maintain an even pressure on the gas supply to said burner, and having a pressure responsive diaphragm, one side of which is exposed to gas pressure, and the other side of which is exposed to the atmosphere, an enclosure for the last named side of the diaphragm and forming a chamber between the diaphragm and side enclosure, a conduit communicating with said chamber and terminating at a point adjacent the flame of the burner, whereby said chamber normally will be maintained filled with air at atmospheric pressure and consequent upon inadvertent seepage of gas through said diaphragm into said chamber, such gas will be diverted to the burner and ignited by the flame thereof.

2. The combination of a gas burner, a gas supply line therefore; a pressure regulator in said line arranged and adapted to maintain an even pressure on the gas supply to said burner, and having a pressure responsive diaphragm, one side of which is exposed to gas pressure, and the other side of which is exposed to the atmosphere, an enclosure for the last named side of the diaphragm and forming a chamber between the diaphragm and said enclosure, a restricted conduit communicating with said chamber and terminating at a point adjacent the flame of the burner, whereby said chamber normally will be maintained filled with air at atmospheric pressure, and when consequent upon inadvertent seepage of gas through said diaphragm into said chamber, such gas will be diverted to the burner and ignited by the flame thereof, and a valve disposed in said conduit and arranged and adapted to automatically close said conduit consequent upon the presence of an excess pressure in said chamber, whereby consequent upon a rupture of said diaphragm the gas will close said conduit and prevent the waste of the gas.

3. The combination with a gas burner and a pressure regulator having a pressure responsive diaphragm one side of which is exposed to gas pressure and the other side of which is exposed to atmospheric pressure, of an apparatus for protection against damages resulting from seepage of gas through the diaphragm, said apparatus comprising an enclosure for the atmospheric side of the diaphragm and a conduit communicating with the enclosure and open to atmosphere at a point adjacent the flame of the burner.

4. The combination with a gas burner and a pressure regulator having a pressure responsive diaphragm one side of which is exposed to atmospheric pressure, of an apparatus for protection against damage resulting from seepage of gas through the diaphragm, comprising an enclosure for the atmospheric side of the diaphragm and a conduit communicating with the enclosure and open to atmosphere at a point adjacent the flame of the burner, and a valve in said conduit and adapted and arranged to close said conduit consequent upon the presence of an excess pressure in said enclosure.

RALPH C. HUGHES.